(12) United States Patent
Young et al.

(10) Patent No.: US 8,639,384 B2
(45) Date of Patent: Jan. 28, 2014

(54) SYSTEMS AND METHODS FOR RECEIVING SHIPMENT PARCELS

(75) Inventors: Eric C. Young, Mercer Island, WA (US); Devesh Mishra, Snoqualmie, WA (US); Timothy Jesse Tien, Seattle, WA (US); Jun Zhao, Bellevue, WA (US); Sameer Vinod Shah, Seattle, WA (US); Zongyi Liu, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 991 days.

(21) Appl. No.: 12/241,475

(22) Filed: Sep. 30, 2008

(65) Prior Publication Data

US 2010/0082151 A1 Apr. 1, 2010

(51) Int. Cl.
*G06F 7/00* (2006.01)
(52) U.S. Cl.
USPC ........... 700/230; 700/226; 700/213; 700/227; 700/217; 235/384; 235/462.14
(58) Field of Classification Search
USPC .................. 700/213–215, 223–226, 228, 230
See application file for complete search history.

(56) References Cited

U.S. PATENT DOCUMENTS

| 4,068,212 A | * | 1/1978 | Templeton | 382/311 |
| 4,308,959 A | * | 1/1982 | Hoover et al. | 209/563 |
| 4,493,420 A | * | 1/1985 | Dennis | 209/587 |
| 5,635,906 A | * | 6/1997 | Joseph | 340/572.3 |
| 5,703,783 A | * | 12/1997 | Allen et al. | 700/213 |
| 5,838,759 A | | 11/1998 | Armistead | |
| 5,889,897 A | * | 3/1999 | Medina | 382/310 |
| 6,047,264 A | * | 4/2000 | Fisher et al. | 705/26.44 |
| 6,400,845 B1 | | 6/2002 | Volino | |
| 6,517,004 B2 | * | 2/2003 | Good et al. | 235/472.02 |

(Continued)

FOREIGN PATENT DOCUMENTS

| JP | A10034088 A | 2/1998 |
| JP | A10231005 A | 9/1998 |

(Continued)

OTHER PUBLICATIONS

European Search Report, dated Apr. 3, 2012.

(Continued)

*Primary Examiner* — Gene Crawford
*Assistant Examiner* — Kyle Logan
(74) *Attorney, Agent, or Firm* — Thomas Horstemeyer, LLP

(57) ABSTRACT

Disclosed are various embodiments of systems and methods for receiving shipment parcels at materials handling facilities. A parcel receiving system has an imaging tunnel through which shipment parcels received at a materials handling facility are passed. While a shipment parcel is passing through the imaging tunnel, a camera captures at least one image of the parcel. The parcel image is electronically analyzed to discover various tracking information and to detect various types of exceptions, such as damage to the parcel or defective tracking information. In addition, the captured image is stored in order to create a visual record of the parcel at the time of reception. This record may be used in a variety of ways, such as resolving or tracking exceptions or providing feedback to the vendor or shipment carrier. In addition, the parcel image may be viewed by a user to enable the user to detect and/or resolve an exception. Thus, the overall process of receiving parcels is facilitated, and the percentage of parcels diverted to an exception bin may be decreased.

27 Claims, 6 Drawing Sheets

(56) References Cited

U.S. PATENT DOCUMENTS

| | | | |
|---|---|---|---|
| 6,539,098 B1 * | 3/2003 | Baker et al. | 382/101 |
| 6,634,551 B2 * | 10/2003 | Barta et al. | 235/385 |
| 6,646,218 B1 * | 11/2003 | Campbell et al. | 209/582 |
| 6,796,433 B2 * | 9/2004 | Daniels et al. | 209/384 |
| 6,889,194 B1 * | 5/2005 | Kadaba | 705/330 |
| 6,892,939 B2 * | 5/2005 | Silver et al. | 235/375 |
| 6,976,007 B1 * | 12/2005 | Boucher et al. | 705/28 |
| 7,085,677 B1 | 8/2006 | Champlin et al. | |
| 7,313,460 B1 * | 12/2007 | Prater et al. | 700/213 |
| 2001/0015380 A1 * | 8/2001 | Good et al. | 235/472.02 |
| 2002/0165729 A1 * | 11/2002 | Kuebert et al. | 705/1 |
| 2003/0109954 A1 * | 6/2003 | Daniels et al. | 700/226 |
| 2004/0073499 A1 * | 4/2004 | Martin et al. | 705/28 |
| 2004/0162631 A1 * | 8/2004 | Roth et al. | 700/217 |
| 2004/0225624 A1 * | 11/2004 | Reynolds et al. | 705/401 |
| 2004/0243690 A1 * | 12/2004 | Hancock et al. | 709/219 |
| 2006/0007304 A1 | 1/2006 | Anderson | |
| 2006/0049252 A1 * | 3/2006 | Guyett et al. | 235/386 |
| 2006/0086794 A1 * | 4/2006 | Knowles et al. | 235/454 |
| 2006/0102726 A1 * | 5/2006 | Good et al. | 235/462.14 |
| 2006/0136236 A1 * | 6/2006 | Horton | 705/1 |
| 2006/0231209 A1 | 10/2006 | Smith | |
| 2007/0012602 A1 | 1/2007 | Baldassari et al. | |
| 2007/0041612 A1 | 2/2007 | Perron et al. | |
| 2007/0135963 A1 * | 6/2007 | Fogel et al. | 700/227 |
| 2008/0121689 A1 | 5/2008 | Good et al. | |
| 2008/0173710 A1 * | 7/2008 | Skaaksrud et al. | 235/384 |
| 2008/0236997 A1 * | 10/2008 | Ebihara | 198/618 |

FOREIGN PATENT DOCUMENTS

| | | |
|---|---|---|
| JP | 2002087532 A | 3/2002 |
| JP | 2003065974 A | 5/2003 |
| JP | 2006064914 A | 10/2006 |
| JP | 2007304866 A | 11/2007 |

OTHER PUBLICATIONS

International Search Report and Written Opinion, dated Nov. 9, 2009 for PCT/US09/58771.

English translation of the abstract for JP 2003065974, published May 3, 2003.

English translation of the abstract for JP 2006064914, published Oct. 5, 2006.

English translation of the abstract for JP 2007304866, published Nov. 22, 2007.

English translation of the abstract for JP A10034088, published Feb. 10, 1998.

English translation of the abstract for JP A10231005, published Sep. 2, 1998.

English translation of the abstract for JP 2002087532, published Mar. 27, 2002.

* cited by examiner

SYSTEMS AND METHODS FOR RECEIVING SHIPMENT PARCELS

BACKGROUND

Some materials handling facilities, such as product distribution or fulfillment centers, process a large amount of inventory, and there can be significant burdens and costs associated with receiving shipment parcels at such a facility. In this regard, for each received parcel, a user often enters tracking information, such as a purchase order (PO) number, a shipment carrier identifier, a vendor identifier, and/or other information that is commonly used to track the parcel for delivery or storage at a materials handling facility. However, different vendors and shipment carriers often use different formats, shipment procedures, and tracking information. In addition, exceptions can further complicate the process for receiving shipment parcels at a materials handling facility. An exception generally refers to a parcel defect or anomaly such as a damaged package or product, defective tracking information, such as an inaccurate, missing, or illegible PO or vendor information, or other shipment errors. Ensuring that the appropriate information has been captured for incoming parcels at a materials handling facility and handling exceptions for such parcels can be extremely burdensome and expensive.

BRIEF DESCRIPTION OF THE DRAWINGS

Many aspects of the disclosure can be better understood with reference to the following drawings. The components of the drawings are not necessarily to scale, emphasis instead being placed upon clearly illustrating the principles of the disclosure. Furthermore, in the drawings, like reference numerals designate corresponding parts throughout the several views.

DETAILED DESCRIPTION

The present disclosure generally relates to systems and methods for receiving shipment parcels at materials handling facilities. One exemplary embodiment of a parcel receiving system has an imaging tunnel through which shipment parcels received at a materials handling facility are passed. While a shipment parcel is passing through the imaging tunnel, a camera captures at least one image of the parcel. The parcel image is electronically analyzed to discover various tracking information, such as purchase order (PO), shipment carrier, or vendor information. The parcel image is also electronically analyzed to detect various types of exceptions, such as damage to the parcel or defective tracking information. Exceptions may be automatically detected via other techniques, such as sensing the size or weight of the parcel. In addition, the captured image is stored in order to create a visual record of the parcel at the time of reception. This record may be used in a variety of ways, such as resolving or tracking exceptions or providing feedback to the vendor or shipment carrier. Thus, the overall process of receiving parcels is facilitated, and the percentage of parcels diverted to an exception bin may be decreased.

Figure 1:
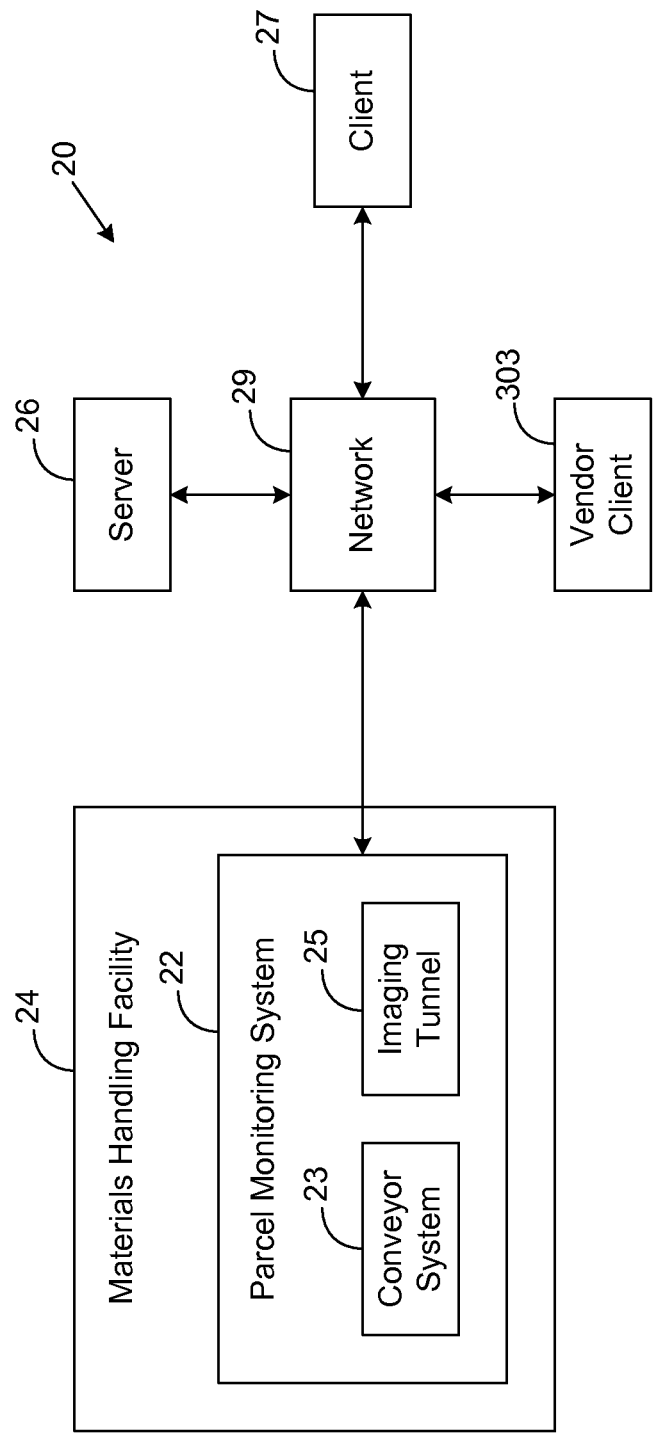
FIG. 1 is a block diagram illustrating an exemplary embodiment of a parcel receiving system.

FIG. 1 depicts an exemplary embodiment of a parcel receiving system 20. The parcel receiving system 20 depicted by FIG. 1 comprises a parcel monitoring system 22 at a materials handling facility 24, such as a warehouse, distribution center, cross-docking facility, order fulfillment center (also referred to as a fulfillment facility), packaging facility, shipping facility, or other facility for performing one or more functions of material (inventory) handling. The parcel monitoring system 22 has a conveyor system 23 and an imaging tunnel 25, which will be described in more detail below. Parcels delivered to the materials handling facility 24 are passed through the imaging tunnel 25, and information about the parcels passing through the tunnel 25 is captured by the system 22.

In the embodiment depicted by FIG. 1, information captured by the parcel monitoring system 22 is uploaded to a server 26 via a network 29. The network 29 comprises any of various types of communication networks, such as the Internet, intranets, wide area networks (WANs), local area network (LANs), wireless networks, other suitable networks, or any combination of two or more such networks. A client 27 is interfaced with the network 29 and accesses the information stored at the server 26 via the network 29. The client 27 analyzes such information and, if desired, displays at least some of the information to a user. In some embodiments, the parcel monitoring system 22 and the client 27 are co-located (e.g., at the materials handling facility 24) and may share resources (e.g., have software running on the same computer). In other embodiments, such as shown by FIG. 1, the client 27 is located remotely from the parcel monitoring system 22 and communicates via the network 29.

Figure 2:
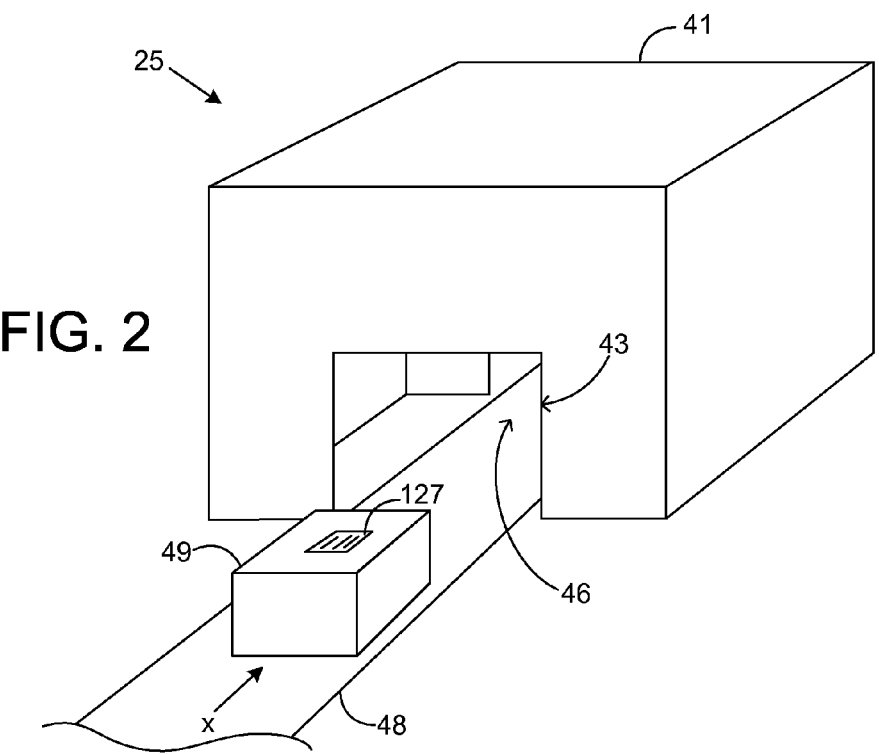
FIG. 2 is a diagram illustrating an exemplary embodiment of an imaging tunnel, such as is depicted in FIG. 1.
Figure 3:
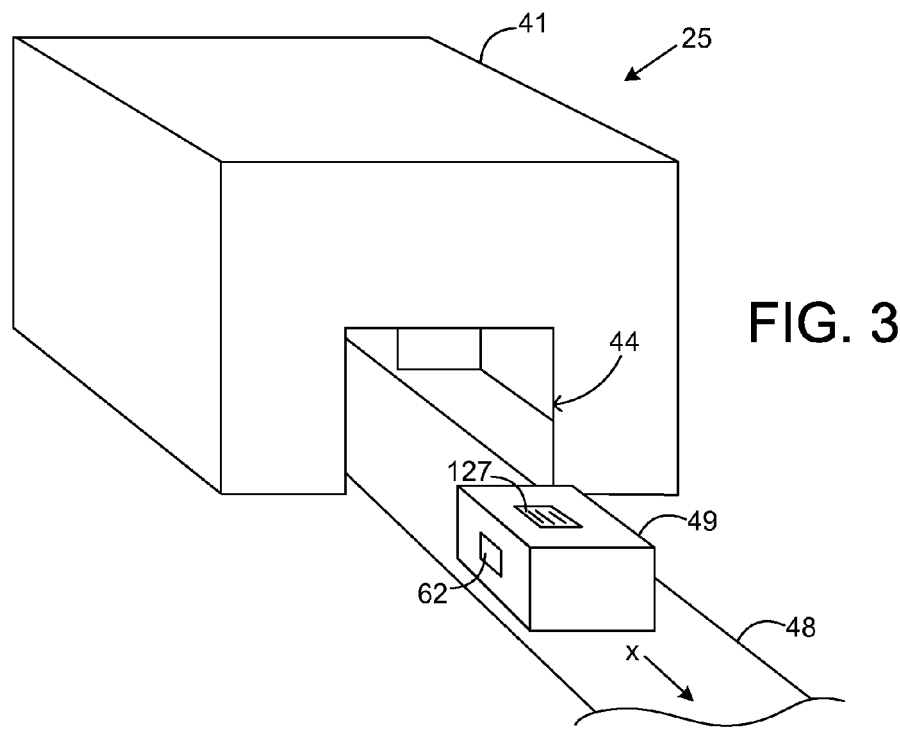
FIG. 3 is a diagram illustrating the imaging tunnel depicted in FIG. 2.

FIGS. 2 and 3 depict an exemplary embodiment of the imaging tunnel 25 of FIG. 1. The imaging tunnel 25 comprises a housing 41 having an opening 43 for an entrance on one side of the housing 41 and an opening 44 for an exit on an opposite side of the housing 41. The openings 43 and 44 mark ends of a passageway 46 that extends through the housing 41. In the exemplary embodiment shown by FIGS. 2 and 3, the conveyor system 23 has a conveyor belt 48 that is moved in the x-direction by a motor (not shown) of the conveyor system 23. The belt 48 extends through the passageway 46 such that shipment parcels 49 positioned on the belt 48 move through the passageway 46 in the x-direction as the belt 48 moves in such direction. A shipment parcel 49 may comprise a box or other type of package for shipping at least one item.

The exemplary conveyor system 23 described above has a movable belt 48 on which parcels 49 are situated in order to move the parcels 49 through the materials handling facility 24. In other embodiments, other types of conveyor systems 23 are possible. For example, the conveyor system 23 may comprise chutes that guide the parcels 49 as they are moving. Such a system 23 may be gravity-fed such that a conveyor system motor is not required or may utilize a belt 48 or other type of track similar to the conveyor system 23 depicted by FIGS. 2 and 3. In yet other embodiments, other types of conveyor systems 23 are possible.

Figure 4:
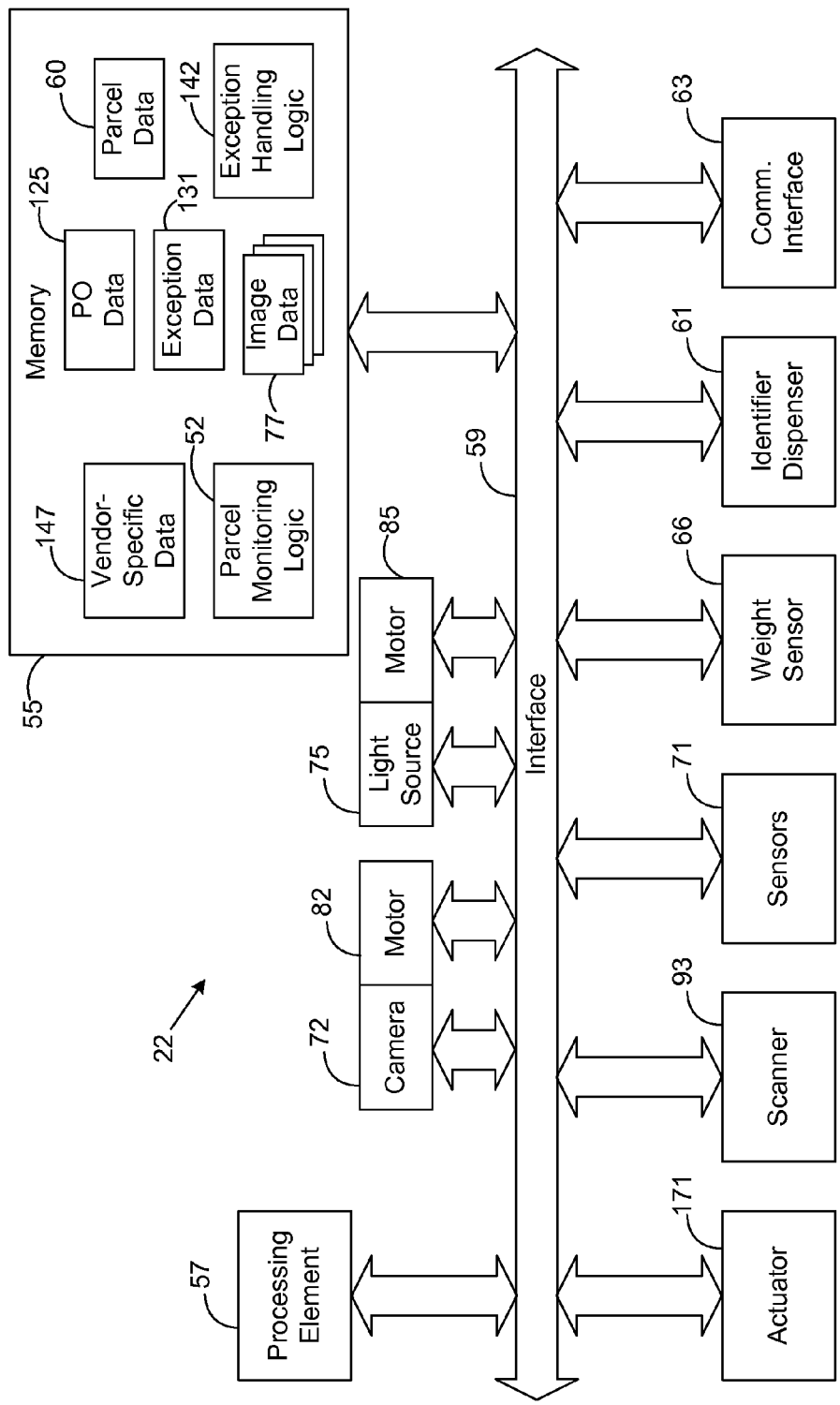
FIG. 4 is a block diagram illustrating an exemplary embodiment of a parcel monitoring system, such as is depicted by FIG. 1.

FIG. 4 depicts an exemplary embodiment of the parcel monitoring system 22. The system 22 comprises parcel monitoring logic 52 that generally controls the operation and functionality of the system 22. The logic 52 can be implemented in software, firmware, hardware, or any combination thereof. In the exemplary embodiment illustrated in FIG. 4, the parcel monitoring logic 52 is implemented in software and stored in memory 55 of the system 22.

The exemplary embodiment of the parcel monitoring system 22 depicted by FIG. 4 comprises at least one conventional processing element 57, such as a digital signal processor (DSP) or a central processing unit (CPU), that communicates to and drives the other elements within the system 22 via an interface 59, which can include conductive connections (e.g., buses), wireless channels, and/or networks, such as a local area network (LAN). If a portion of the parcel monitoring logic 52 is implemented in software, the processing element 57 fetches and executes instructions of the logic 52 according to known techniques.

The parcel monitoring logic 52 is configured to maintain data 60, referred to hereafter as "parcel data," indicative of the parcels 49 handled by the system 22. In this regard, the logic 52 assigns each parcel 49 a unique identifier, referred to hereafter as the "parcel's identifier" or "parcel identifier," and stores this identifier into memory 55 as part of the parcel data 60. As will be described in more detail hereafter, various types of information indicative of the parcel 49 are stored in memory 55 and correlated with the parcel identifier. Various techniques may be used to correlate an identifier assigned to a parcel 49 and the information that is indicative of the parcel 49. For example, the logic 52 may define various entries in the memory 55 and may store within each entry the identifier of a parcel 49 and the information pertaining to the identified parcel 49. Thus, the information within the same entry is correlated with the parcel identifier stored in the same entry. In other embodiments, other types of techniques can be used to correlate a parcel identifier with the information pertaining to the identified parcel 49.

In one exemplary embodiment, the assigned parcel identifier is read directly from the parcel 49. For example, the system 22 may be configured to read a purchase order (PO) number, a shipping number, or other type of character string attached to the parcel 49 and use such string as the parcel's identifier. Alternatively, the parcel monitoring logic 52 may randomly generate or otherwise provide different identifiers for different parcels 49.

The identifier assigned to a parcel 49 is preferably attached to such parcel 49 in order to assist users in distinguishing between parcels 49. If the identifier is read from the parcel 49, then the parcel 49 already has the identifier attached to it without any further action by the system 22. However, if the identifier assigned to a parcel 49 is not attached to the parcel 49, then an identifier dispenser 61 is configured to attach the identifier to the parcel 49. In this regard, the parcel monitoring logic 52 transmits data defining the parcel identifier to the dispenser 61, which prints the identifier on a label 62 (FIG. 3) having an adhesive on one side. The dispenser 61 then positions the label 62 such that the side with the adhesive contacts the parcel 49 binding the label 62 to the parcel 49, as shown by FIG. 3.

Referring to FIG. 4, the system 22 also comprises a communication interface 63, such as a modem, for enabling the system 22 to communicate with the network 29 (FIG. 1). In one exemplary embodiment, the communication interface 63 communicates data via Internet Protocol (IP), but other types of communication protocols are possible in other embodiments.

The system 22 comprises a weight sensor 66 for measuring the weight of the parcels 49 passing through the imaging tunnel 25. In one exemplary embodiment, the weight sensor 66 is positioned under the belt 48 so that, as a parcel 49 is moved by the belt 48 over the weight sensor 66, the sensor 66 automatically senses the weight of the parcel 49. For each weighed parcel 49, the weight sensor 66 transmits data indicative of the parcel's weight to the parcel monitoring logic 52, which updates the parcel data 60 based on the indicated weight. In this regard, the logic 52 updates the parcel data 60 to include data indicative of the measured weight and correlates such data with the identifier assigned to the parcel 49 by the logic 52.

In addition, the system 22 comprises at least one sensor 71 for sensing at least one parameter pertaining to a parcel 49 being handled by the system 22. For example, the sensor 71 may be configured to sense a size or a position of the parcel 49. Various types and numbers of sensors 71 may be employed to sense various parcel parameters. In one exemplary embodiment, the sensors 71 are mounted on the housing 41 and positioned in an interior of the housing 41. However, the sensors 71 can be mounted and/or positioned differently in other embodiments.

In one exemplary embodiment, the sensors 71 comprise a plurality of infrared sensors (not specifically shown) positioned at various locations around a parcel 49 as it is moving through the tunnel 25. Each such sensor 71 has an infrared transmitter (not specifically shown) and receiver (not specifically shown). The transmitter emits infrared radiation that is detected by the receiver. In one embodiment, the radiation reflects from a surface of the parcel 49 and the time of travel from the transmitter to the receiver indicates the parcel's distance from the sensor 71. The information sensed by the sensors 71 is transmitted to the parcel monitoring logic 52, which can be configured to use such information for a variety of purposes.

For example, in at least one embodiment, the logic 52 uses the information from the sensors 71 (e.g., the parcel's distance from multiple sensors 71) to determine the parcel's dimensions. In another example, the logic 52 uses such information to determine the parcel's position relative to the belt 48 or other component of the system 22. Exemplary techniques for using the information from the sensors 71 will be described in more detail below. The information from the sensors 71 and/or information derived from the sensors 71, such as parcel size or position, is stored in memory 55 as part of the parcel data 60. The information pertaining to a particular parcel 49 is correlated with the identifier assigned to the parcel 49 by the logic 52.

As shown by FIG. 4, the system 22 comprises at least one camera 72 that is configured to capture digital images of parcels 49 passing through the tunnel 25. In one exemplary embodiment, the camera 72 is mounted on the housing 41 and is located interior to the housing 41. Further, the camera 72 captures an image of a parcel 49 while the parcel 49 is passing through the housing 41, which shields the parcel 49 from at least some ambient light at the time of image capture. By shielding the parcel 49 from ambient light, the system 22 can better control the lighting characteristics for the parcel 49 at the time of image capture, helping to improve the quality of the images captured by the camera 72. Data 77, referred to hereafter as "image data," defining the captured image is stored in memory 55 and correlated with the parcel identifier assigned to the imaged parcel 49. Thus, using a parcel's identifier, the images of the identified parcel 49 stored in memory 55 can be automatically located and retrieved.

In one exemplary embodiment, a light source 75 is mounted on the housing 41 and located interior to the housing 41. The light source 75 produces light, which illuminates the parcel 49 at the time of image capture.

Note that characteristics of the light source 75, such as position relative to the parcel 49 and/or brightness, and of the camera 72, such as position relative to the parcel 49 and/or lens focusing, can be automatically selected and controlled in an effort to provide a high quality image of the parcel 49. Further, in the embodiment shown by FIG. 4, the camera 72 and the light source 75 are respectively coupled to motors 82 and 85, which move the camera 72 and light source 75.

In this regard, the parcel monitoring logic 52, for a parcel 49 passing through the tunnel 25, is configured to control the motor 82 in order to change a characteristic of the camera 72 based on some parameter, such as a size of the parcel 49 or a position of the parcel 49 on the belt 48. For example, in at least one embodiment, the logic 52 is configured to control the motor 82 such that the camera 72 is a particular distance from the parcel 49 at the time of image capture. As a mere example, the logic 52, is configured to position the camera 72 based on information from the sensors 71, such that the camera 72 is a predefined distance from the parcel 49 at the time of image capture. Alternatively, the logic 52 may dynamically select the camera's position from the parcel 49 depending on the size of the parcel 49 or some other parameter. Further, in one exemplary embodiment, the logic 52 is configured to use the motor 82 to control the focus of the camera 72 at the time of image capture based on some parameter, such as a size or position of the parcel 49.

Similarly, the parcel monitoring logic 52, for a parcel 49 passing through the tunnel 25, is configured to control the motor 85 in order to change a characteristic of the light source 75 based on some parameter, such as a size of the parcel 49 or a position of the parcel 49 on the belt 48. For example, in at least one embodiment, the logic 52 is configured to control the motor 85 such that the light source 75 is a particular distance from the parcel 49 at the time of image capture. As a mere example, the logic 52 is configured to position the light source 75 based on information from the sensors 71, such that the light source 75 is a predefined distance from the parcel 49 at the time of image capture. Alternatively, the logic 52 may dynamically select the light source's position from the parcel 49 depending on the size of the parcel 49 or some other parameter. Further, in one exemplary embodiment, the logic 52 is configured to control the brightness of the light source 75 at the time of image capture based on some parameter, such as a size or position of the parcel 49.

As a mere example, assume that it is desirable for the light source 75 to be positioned 3.0 inches from a parcel 49 at the time of image capture and for the camera 72 to be position 2.0 inches from a parcel 49 at the time of capture. Further assume that, based on the sensors 71, the logic 52 determines that, at the time of image capture, the parcel 49 will be located 3.5 inches from the light source 75 and 2.5 inches from the camera 72. In such an example, the logic 52 is configured to control the motors 82 and 85 to move the light source 75 and camera 72 such that they are respectively positioned 3.0 and 2.0 inches from the parcel 49 at the time of image capture. Various other techniques for controlling the characteristics of the camera 72 and/or the light source 75 based on the sensors 71 are possible in other embodiments.

As shown by FIG. 4, the system 22 comprises a scanner 93 configured to read certain information from a parcel 49 being handled by the system 22. For example, the vendor or shipper may attach bar codes for conveying certain information, such as product, order, or shipping numbers or other types of identifiers, and the scanner 93 is configured to read such information. Data indicative of the read information is transmitted to the parcel monitoring logic 52, which stores such information in memory 55 as part of the parcel data 60. In this regard, the logic 52 correlates the information read from a parcel 49 with the identifier assigned to the parcel 49 by the logic 52.

Note that any of the components, such as scanner 93, sensors 71, camera 72, and identifier dispenser 61, that communicate with the logic 52 may be conductively coupled to the interface 59 to enable communication with the logic 52. Alternatively, any such components may be configured to communicate wireless signals such that a physical connection is unnecessary. For example, the scanner 93 may be a hand-held device configured to communicate wirelessly. Similarly, the camera 72 may be a hand-held device configured to communication wirelessly. In one exemplary embodiment, the scanner 93 and camera are combined as a single hand-held device that wirelessly communicates with the logic 52. Further, one or more networks, such as a LAN or WAN, may be used by any of the components of the system 22 to communicate with the logic 52.

Purchase order (PO) data 125 is stored in memory 55 of the parcel monitoring system 22. The PO data 125 includes information regarding the purchase orders that have been sent to vendors. For example, for each such order, the PO data 125 may indicate the quantity and type of items that have been ordered, the order date, and/or the expected shipment or delivery date. The PO data 125 may also indicate the approximate size and/or weight of the expected parcel 49 for fulfilling the purchase order. Other types of information about a purchase order may be indicated by the PO data 125.

The parcel monitoring logic 52 is configured to analyze the parcel data 60 and/or image data 77 in an effort to capture various information and detect exceptions. For example, in at least one embodiment, the logic 52 is configured to capture PO information, such as a PO number, from a PO label 127 (FIG. 2) and/or other tracking information attached to the parcel 49 and to store such information in memory 55 as part of the parcel data 60. The PO information can be received via scanner 93. However, some labels 127 may have PO information that is not readable via scanner 93. If PO information is not received from scanner 93, then the logic 52 is configured to search the image data 77 in an effort to locate the desired PO information.

As an example, assume that the PO number for a particular parcel 49 is not received from the scanner 93, and the logic 52 searches the parcel's image data 77 for the PO number. In this regard, the logic 52 attempts to locate a bar code or alpha-numeric characters within the images defined by the data 77 correlated in memory 55 with the parcel's identifier. The logic 52 may employ known optical character recognition (OCR) algorithms in an attempt to locate and read PO information from the images.

In another example, the logic 52 discovers a vendor identifier for the vendor that shipped the parcel 49. Such a vendor identifier may be located on the PO label 127 and discovered via scanner 93 or by analyzing the image data 77 similar to the techniques described above for discovering the PO number. In addition, the vendor identifier may be included in the PO data 125, and logic 52 may discover the vendor identifier from the PO data 125 once the entry in such data 125 correlated with the parcel 49 has been located. Further, the vendor identifier, if read from the parcel 49, may be helpful in locating the appropriate entry in the PO data 125 particularly if the PO number on the parcel 49 cannot be located or can be only partially read.

In some embodiments, the logic 52 is configured to compare a located character string to the predefined PO data 125 stored in memory 55. If the located character string matches one of the PO numbers indicated by the data 125, then the logic 52 identifies the located character string as being a PO number.

If the logic 52 is able to locate the PO number in the image data 77, then the logic 52 stores such number in the data 60. However, if the logic 52 is unable to find the PO number, then the logic 52 detects an exception. In response to such a detection, the logic 52 updates exception data 131 stored in memory 55 in order to log the exception occurrence. Handling of exceptions will be described further below.

If the parcel's PO number is found and if such PO number matches a PO number in the data 125, then the logic 52 retrieves from the data 125 other PO information correlated with the matched PO number. For example, the retrieved PO information may indicate the expected size or weight range for the parcel 49. The logic 52 then compares this retrieved information to information sensed by the system 22 in an effort to detect an exception. For example, in one embodiment, the logic 52 compares the parcel's weight sensed by the weight sensor 66 to the expected weight range indicated for the parcel 49 by the PO data 125. If the sensed weight falls outside of the expected weight range, then it is likely that the vendor sent the wrong item or the wrong number of items for the PO. Thus, the logic 52 detects an exception if the sensed weight is outside of the expected weight range.

In another example, the logic 52 compares at least one dimension (e.g., length, width, or height) of the parcel 49, as measured by at least one sensor 71, to an expected range for the dimension indicated by the PO data 125 for the parcel 49. If the measured dimension is outside of the expected range, then it is likely that the vendor sent the wrong item or the wrong number of items for the PO. Thus, the logic 52 detects an exception if the measured dimension is outside of the expected range.

It is possible for the measured dimension to be derived from the image data 77 rather than the sensors 71. In this regard, it is possible for the logic 52 to employ known edge detection techniques to locate edges of the parcel 49. If the distance of the parcel 49 from the camera 72 is known, then the logic 52 can calculate the actual distance from one parcel edge to another. Other techniques for determining a dimension of the parcel 49 based on the image data 77 are possible in other embodiments.

Note that other types of exceptions can be automatically detected by the logic 52 in other examples. For example, if a side of the parcel 49 is crushed or otherwise deformed during delivery, then by analyzing the image data 77 or data from the sensors 71, the logic 52 may detect such deformation and log an exception in response.

As described above, when an exception is detected, the logic 52 logs the exception in the exception data 131. In particular, the logic 52 stores information about the exception in the data 131. For example, the logic 52 may store the time of the exception occurrence and information regarding the type of exception detected. In this regard, exception types are coded, and the logic 52 stores the code for the detected exception in the data 131. As an example, the exception code for a missing PO number may be "12." In such an example, when the logic 52 is logging an exception in response to a determination that the PO number cannot be located, the logic 52 stores the code value "12" in the data 131. Thus, the data 131 can be analyzed to determine not only the number and times of exception occurrences but also the types of exceptions that occurred.

For each exception, the logic 52 also stores information from parcel data 60. For example, data indicative of the parcel's size or weight may be included in the exception data 131 for the detected exception. If the vendor's identifier is known (e.g., received from scanner 93, determined by analyzing the image data 77 or PO data 125, or otherwise discovered by logic 52), then such identifier is included in the exception data 131. If the PO number for the parcel 49 is discovered, then the PO number is included in the exception data 131. Various other types of information about the parcel 49 to which the exception pertains may be stored in the exception data 131. Accordingly, by maintaining the data 131, the logic 52 effectively tracks exceptions. As will be described in more detail below, such data 131 can be analyzed to discover various statistics and information about the exceptions detected by the system 22.

Upon detecting an exception, the parcel monitoring logic 52 calls or otherwise activates exception handling logic 142 for handling and attempting to resolve the exception. The exception handling logic 142 may be implemented in hardware, firmware, software, or any combination thereof. In one exemplary embodiment, as depicted by FIG. 4, the exception handling logic 142 is implemented in software and stored in memory 55 of the parcel monitoring system 22 although the logic 52 may be stored remotely from the parcel monitoring logic 52, if desired.

Figure 5:
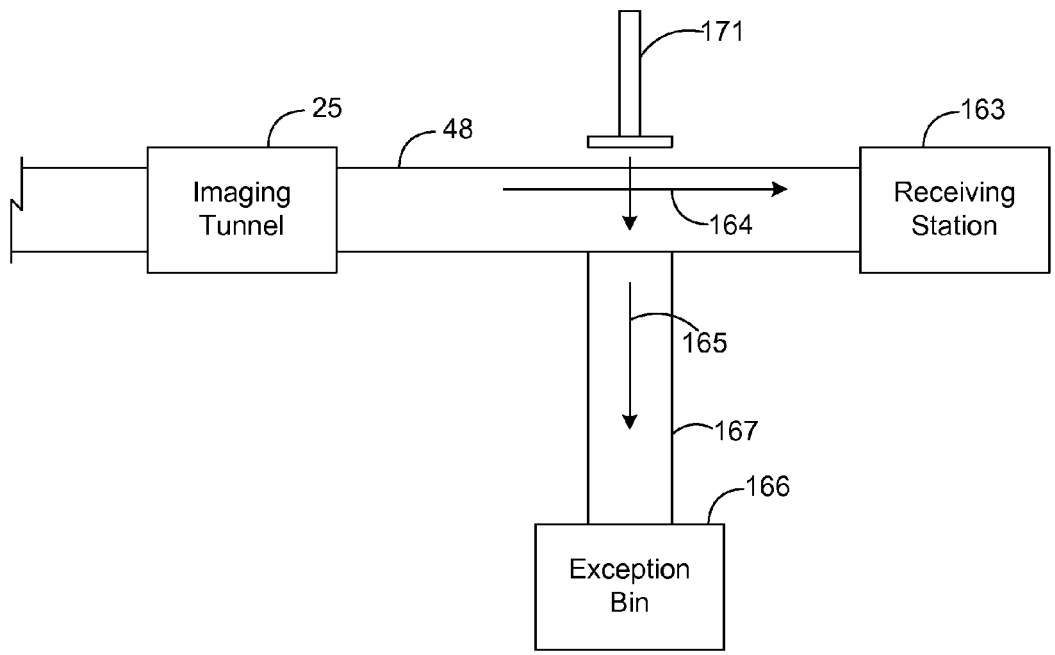
FIG. 5 is a diagram illustrating an exemplary flow of a shipment parcel through a materials handling facility, such as is depicted by FIG. 1.

In general, if the parcel monitoring logic 52 does not detect an exception or if the exception handling logic 142 is able to timely resolve the exception, as will be described in more detail below, then the parcel 49 passes through the imaging tunnel 25 and to a receiving station 163, as shown by FIG. 5. In this regard, the belt 48 defines a parcel path 164, referred to hereafter as the "receiving path," that takes the parcels 49 traveling along the path 164 to the receiving station 163. At the receiving station 163, the parcel 49 is opened, and the parcel's items are received, unpacked, and processed for storage at the materials handling facility 24 (FIG. 1). However, if the parcel monitoring logic 52 detects an exception that is not timely resolved by the exception handling logic 142 or otherwise, then the parcel 49 is diverted from the receiving path 164 to a path 165, referred to hereafter as the "exception path," that takes the parcels 49 traveling along the exception path 165 to an exception bin 166. In the embodiment depicted by FIG. 5, a conveyor belt 167 carries parcels 49 along the exception path 165.

In this regard, as shown by FIGS. 4 and 5, the conveyor system 23 has an actuator 171, such as a movable arm, that is activated by the parcel monitoring logic 52 when the logic 52 detects an exception that is not resolved by the time the parcel 49 reaches the actuator 171. When activated, the actuator 171 pushes or otherwise forces the parcel 49 associated with the unresolved exception to the exception path 165, which takes the parcel 49 to the exception bin 166 instead of the receiving station 163. Once a parcel 49 reaches the exception bin 166, the parcel 49 generally remains at the exception bin 166 until a user is able to manually investigate the exception. In general, it is desirable to reduce the number of parcels 49 diverted to the exception bin 166 in order to reduce transaction costs related to personnel having to manually investigate and handle exceptions of parcels 49 diverted to such bin 166.

In one exemplary embodiment, the exception handling logic 142, which attempts to resolve exceptions and reduce the number of parcels 49 diverted to the exception bin 166, is configurable based on information gleaned by handling exceptions detected by the parcel monitoring logic 52 over time so that the exception handling logic 142 effectively learns how to automatically resolve certain exceptions in the future. In this regard, when an exception is detected and resolved, the exception handling logic 142 may be updated based on information gleaned by resolving the exception so that the logic 142 can automatically resolve an exception of the same type in the future.

As an example, assume that the parcel monitoring logic 52 is unable to locate a PO number for a parcel 49 and, therefore, detects an exception. Assume that a user reviewing the exception data 131 and/or the image data 77 discovers that the exception occurred because the PO label 127 was oriented upside down when the image of the parcel 49 was captured by camera 72 such that the character recognition techniques employed by the parcel monitoring logic 52 were unable to recognize the characters of the PO label 127. Thus, the user may configure the exception handling logic 142 such that, upon an exception resulting from a missing PO number, the logic 142 re-orients (e.g., flips) the image data 77 of the parcel 49 associated with the exception. The logic 142 then calls or otherwise activates the parcel monitoring logic 52 to analyze the re-oriented image data 77 in an effort to locate the PO number. Thus, if the same problem later occurs for another parcel 49 in the future, the parcel monitoring logic 52 detects an exception and provides the exception handling logic 142 the exception identifier for a missing PO number. In response, the exception handling logic 142 re-orients the image data 77 for the future parcel 49, and the logic 142 calls or otherwise activates the parcel monitoring logic 52 to analyze the re-oriented image data 77. Based on such analysis, the parcel monitoring logic 52 may successfully find the PO number thereby resolving the exception without user intervention.

Note that there are a variety of ways that the exception handling logic 142 can be configured to assist with resolving exceptions. For example, a user may write and compile code to be executed by the processing element 57. Such code may be written without modifying the parcel monitoring logic 52 or even interrupting the operation of the logic 52. Alternatively, the same code used to implement the parcel monitoring logic 52 may be updated to incorporate the functionality described herein for the exception handling logic 142 such that logic 52 and logic 142 are implemented via the same body of code. Various other techniques for configuring the exception handling logic 142 are possible in other embodiments.

In at least one exemplary embodiment, the exception handling logic 142 is configured to implement vendor-specific rules in attempting to resolve or handle exceptions detected by the parcel monitoring logic 52. In this regard, in some situations, the parcel monitoring logic 52 is able to identify the vendor that shipped a parcel 49 associated with an exception. For example, the parcel monitoring logic 52, in analyzing the image data 77, may find a vendor identifier identifying the parcel's vendor. Such vendor information may be captured via other techniques, such as via a scanning operation performed by the scanner 93 or an input entered by a user. If the vendor identifier is located, the parcel monitoring logic 52 provides the vendor identifier to the exception handling logic 142, which attempts to resolve the exception based on the vendor identifier.

As a mere example, assume that a user, by analyzing the exception data 131 for multiple parcels 49, discovers a relatively high frequency of exceptions of the same type for a particular vendor. Further assume that, after investigating the source of the exception, the user discovers that the PO labels 127 from the vendor are typed in a peculiar font that likely makes it difficult for the parcel monitoring logic 52 to read automatically via OCR. In such an example, the user may define data 147, referred to hereafter as the "vendor-specific data," defining similar characters typically used by the vendor. The user may also configure the exception handling logic 142 to utilize the vendor-specific data 147 to resolve exceptions for parcels 49 from the foregoing vendor. In this regard, when the parcel monitoring logic 52 provides a vendor identifier and an exception identifier indicating that the logic 52 is unable to read a PO number for a parcel 49 from the vendor, the exception handling logic 142, in response to such identifiers, calls or otherwise activates an OCR function and instructs the OCR function to utilize the vendor-specific data 147 in performing OCR on the image data 77 for the parcel 49. Thus, the OCR function, which may be part of the same body of code as the parcel monitoring logic 52 or separate from such logic 52, compares the image data 77 to the vendor-specific data 147 to identify characters within the image data 77 possibly helping the OCR function to locate and read the characters of the PO label 127. Therefore, after configuring the exception handling logic 142 to use the vendor-specific data 147, as described above, future exceptions for parcels 49 from the foregoing vendor may be automatically resolved by the system 22. In essence, the system 22 resolves the exceptions by learning the shipping peculiarities of the vendor. In other embodiments, other types of exceptions based on other types of vendor-specific information are possible.

In addition, the vendor-specific data 147 may also define various vendor-specific rules pertaining to how certain exceptions are to be handled. Based on the vendor identifier and exception identifier for a detected exception, the exception handling logic 142 is configured to consult the vendor-specific data 147 to determine if there is a rule defined by such data 147 for the identified vendor and exception. If so, the logic 142 implements the defined rule.

As a mere example, assume that an operator of the facility 24 and a vendor have an understanding that, if an incorrect number of items are shipped for a given a purchase order, then the parcel 49 is to be received and the purchase price appropriately adjusted to account for the missing or additional items included in the shipment. In such an example, the vendor-specific data 147 may indicate that, in response to detection of such an exception from the foregoing vendor, the system 22 is to receive the parcel 49 via the receiving station 163 instead of the exception bin 166 despite the detected exception. There are various techniques that may be used to define such a rule in the vendor-specific data 147.

Figure 6:
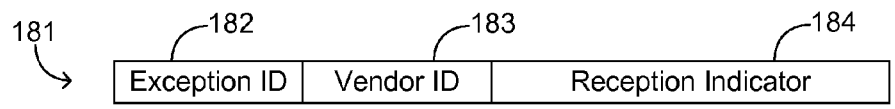
FIG. 6 is a block diagram illustrating an exemplary entry of vendor-specific data, such as is depicted in FIG. 4.

In one exemplary embodiment, the vendor-specific data 147 has a plurality of entries in which each entry 181, as shown by FIG. 6, has an exception identifier 182 identifying the exception type correlated with the entry 181 and a vendor identifier 183 identifying the vendor correlated with the entry. The entry 181 also has a reception indicator 184 indicating whether or not a parcel 49 from the identified vendor and having the identified exception is to be received via the receiving station 163. For example, the reception indicator 184 could be a one-bit indicator, although other types of indicators may be employed in other embodiments.

When the exception handling logic 142 receives an exception identifier and vendor identifier for an exception detected by the parcel monitoring logic 52, the exception handling logic 142 consults the vendor-specific data 147 to determine if there is an entry 181 correlated with both of the received identifiers. If so, the exception handling logic 142 checks the entry's reception indicator 184 to determine whether the parcel 49 is to be received. If the indicator 184 indicates that the parcel 49 is to be received, then exception handling logic 142 instructs the parcel monitoring logic 52 to allow the parcel 49 to proceed to the receiving station 163. In response, the parcel monitoring logic 52 controls the actuator 171 such that the parcel 49 is not diverted to the exception path 165, thereby allowing the parcel 49 to travel to the receiving station 163.

However, if the reception indicator 184 indicates that the parcel 49 is not to be received, then the exception handling logic 142 instructs the parcel monitoring logic 52 to divert the parcel 49 to exception path 165. In response, the parcel monitoring logic 52 controls the actuator 171 such that the parcel 49 is forced to the exception path 165, thereby causing the parcel 49 to travel to the exception bin 163.

Note that parcels 49 having the same exception can be handled differently by the system 22. For example, the reception indicator 184 for an entry 181 correlated with one vendor identifier may have a different value than the reception indicator 184 for an entry 181 correlated with a different vendor. Further, the exception handling logic 142 may be configured to handle an exception according to a default rule if the vendor identifier and exception identifier for an exception do not respectively match the vendor identifier and exception identifier of any of the entries 181 or if the vendor identifier is unknown. For example, the logic 142 may be configured to instruct the parcel monitoring logic 52 to divert parcels 49 associated with such unmatched identifiers to the exception bin 166.

In other examples, other types of rules for handling various types of exceptions may be defined by data stored in the memory 55. Such rules may be vendor-specific, as described above, or vendor-generic (i.e., independent of the associated vendor identifier). For example, a rule may apply to a particular type of exception for all vendors.

In at least one embodiment, the exception handling logic 142 is configured to transmit a notification to a vendor in response to an exception detected for one of the vendor's parcels 49. In this regard, the vendor-specific data 147 includes contact information, such as an IP address or telephone number, for various vendors. Based on the vendor identifier provided by the parcel monitoring logic 52, the exception handling logic 142 is configured to look up the contact information for the vendor of a parcel 49 for which an exception is detected, and the logic 142 is configured to communicate a notification to the vendor based on such contact information. For example, the logic 142 may look up the email address of a vendor and transmit an email message to the vendor via network 29. Such notification may include information pertaining to the detected exception, such as information indicative of the type of exception detected. In at least one embodiment, the notification includes the image data 77 captured for the parcel 49 associated with the exception and/or the parcel data 60 correlated with such parcel 49. Thus, the vendor may view such data 77 and/or 60 to see an image of the parcel 49 captured by the system 22 and/or other information pertaining to the parcel 49. Accordingly, the vendor at least is aware that the exception has occurred. In addition, based on the information included in the notification, the vendor may help resolve the exception.

As a mere example, assume that the PO label 127 for a parcel 49 is damaged during shipment such that one digit of the PO label 127 is illegible. By viewing the image data 77 correlated with the parcel 49 and, in particular, the legible information printed on the PO label 127, the vendor may be able to determine the missing digit. Thus, the vendor may reply with a message that includes the missing PO number thereby helping a user of the system 20 to resolve the exception. In other examples, the vendor may assist in resolving other types of exceptions.

In at least one exemplary embodiment, the parcel monitoring logic 52 is configured to automatically upload the parcel data 60, image data 77, and exception data 131 to a server 26 (FIG. 1) via network 29. Further, various communication devices can access such data 60, 77, and 131 via network 29. FIG. 1 depicts an exemplary embodiment in which a client 27 interfaced with the network 29 accesses the data 60, 77, and 131 at the server 26 and displays such data to a user for enabling him or her to resolve and/or track exceptions, as will be described in more detail below. The client 27 may comprise a desk-top or lap-top computer, a hand-held personal digital assistant (PDA), or some other known device for exchanging data with a network.

Figure 7:
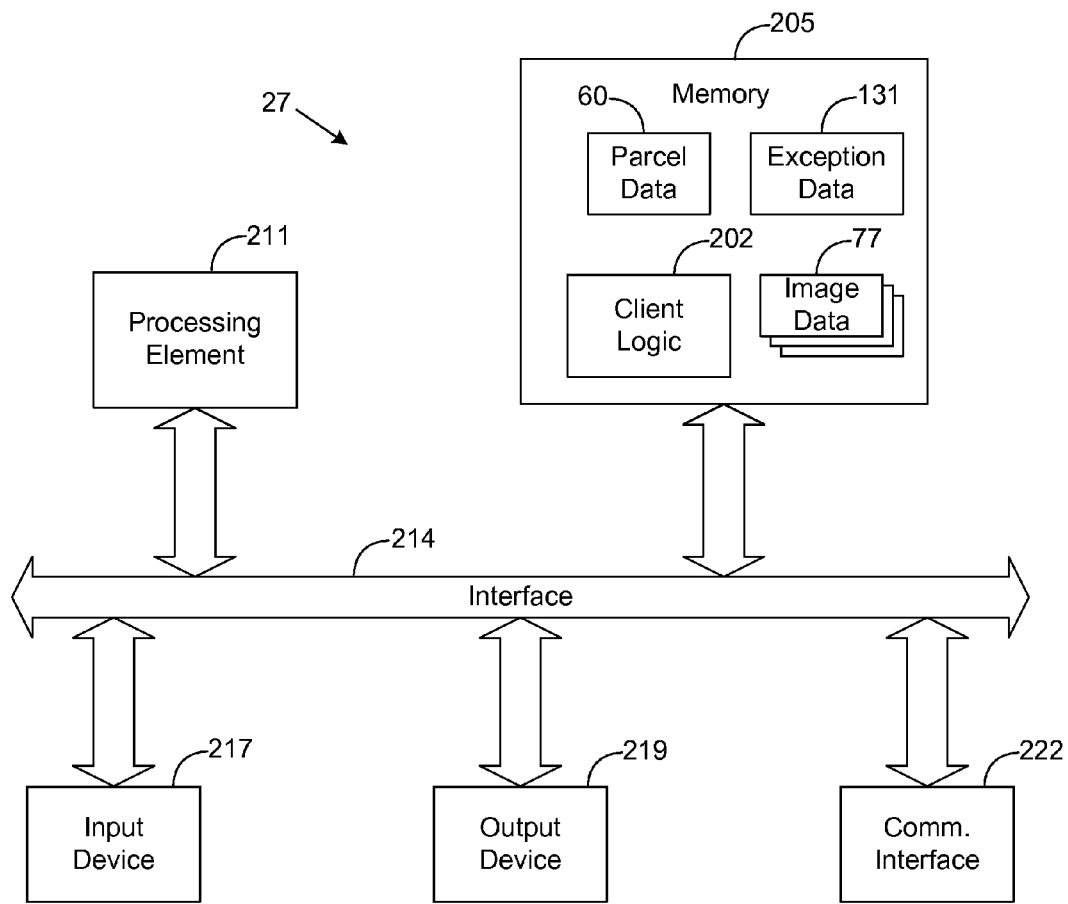
FIG. 7 is a block diagram illustrating an exemplary embodiment of a client, such as is depicted in FIG. 1.

FIG. 7 depicts an exemplary embodiment of the client 27. The client 27 comprises client logic 202, which generally controls the operation and functionality of the client 27. The logic 202 may be implemented in software, firmware, hardware, or any combination thereof. In the exemplary embodiment depicted by FIG. 7, the logic 202 is implemented in software and stored within memory 205 of the client 27.

Although the logic 52, 142, and 202 (FIGS. 4 and 7) are shown to be embodied in software or code executed by general purpose hardware as discussed above, as an alternative the logic 52, 142, and 202 (FIGS. 4 and 7) may also be embodied in dedicated hardware or a combination of software/general purpose hardware and dedicated hardware. If embodied in dedicated hardware, the logic 52, 142, and 202 (FIGS. 4 and 7) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

Also, where the logic 52, 142, and 202 (FIGS. 4 and 7) comprise software or code, such logic 52, 142, and 202 can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the disclosure, a "computer-readable medium" can be any medium that can contain, store, or maintain the logic 52, 142, and 202 (FIGS. 4 and 7) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The exemplary embodiment of the client 27 depicted by FIG. 7 comprises at least one conventional processing element 211, such as a digital signal processor (DSP) or a central processing unit (CPU), that communicates to and drives the other elements of the client 27 via an interface 214, which can include conductive connections (e.g., buses), wireless channels, and/or networks, such as a local area network (LAN). If a portion of the client logic 202 is implemented in software, the processing element 211 fetches and executes instructions of the logic 202 according to known techniques.

As shown by FIG. 7, the client 27 comprises an input device 217, such as a keyboard or mouse, for enabling a user to input data, and the system 27 comprises an output device 219, such as printer or monitor, for outputting data to a user. The client 27 also comprises a communication interface 222, such as a modem, for enabling communication with the network 29 (FIG. 1).

In one exemplary embodiment, the client logic 202 is configured to download the parcel data 60, image data 77, and exception data 131 from the server 26 and store such data in memory 205. The client logic 202 is configured to display the exception data 131, as well as the image data 77 and/or parcel data 60, via the output device 219 or otherwise in an effort to provide a user of the client 27 with sufficient information to resolve exceptions.

For example, for at least one exception, the client logic 202 is configured to display the image data 77 captured for the parcel 49 associated with the exception. By viewing the image data 77, the user of the client 205 may be able to resolve the exception or provide feedback on how the exception is to be handled. As an example, assume that the parcel monitoring logic 52 is unable to locate or read a PO label 127 for a parcel 49 and, therefore, detects an exception for such parcel 49. Further, assume that the PO number of the label 127 has been hand-written in a sloppy manner such that OCR techniques employed by the parcel monitoring logic 52 are unable to find or correctly read the PO number. The user, upon viewing the image data 77 and seeing the image of the PO label 127 defined by such data 77, may be able to discern the handwritten PO number. Accordingly, the user enters, via input device 217, the correct PO number, and the client logic 202 updates the exception data 131 and/or parcel data 60 to indicate that the exception has been resolved and to include the correct PO number for the parcel 49.

In another example, assume that the user of client 27 is unable to resolve an exception based on the information displayed by the client 27. In such a case, the user may initiate communication with a parcel's vendor in an effort to resolve the exception. For example, assume that the missing PO number is not a result of poor handwriting by the vendor but is instead attributable to damage to the PO label 127 during shipment. In such case, the user may call the vendor or otherwise communicate with the vendor (e.g., via email or text messaging), providing the vendor with various information about the exception, including possibly the parcel data 60 and/or image data 77 for the parcel 49. Based on such information, the vendor may determine the missing PO number and provide it to the user of the client 27 who then enters the missing PO number via input device 217 as described above.

In yet another example, assume that the exception is attributable to an incorrect shipment, such as an incorrect number of items or types of items included in the parcel 49. The user of the client 27 could communicate with the vendor in an attempt to reach a mutually agreeable solution to the exception. For example, the user and vendor may agree that the parcel 49 is to be returned to the vendor for a refund or that the parcel 49 is to be accepted with an appropriate adjustment to the purchase price. After agreeing on a workable solution, the user transmits a message to a user at the materials handling facility 24 with appropriate instructions to effectuate the agreed solution. For example, the instructions may indicate that the user at the facility 24 is to retrieve the parcel 49 from the exception bin 166 and to return the parcel 49 to the vendor or send the parcel to the receiving station 163 depending on the agreement reached with the vendor.

Accordingly, as described above, a user remote from the materials handling facility 24 can assist in resolving exceptions detected by the system 22 or determining how such exceptions are to be handled. Note that it is unnecessary for the client 27 to be remote from the facility 24. For example, the client 27 may be located at the facility 24 and, in some cases, may share hardware and/or software resources of the system 22. Thus, a user at the facility 24 may resolve exceptions or determine how to handle exceptions in the same way as a remote user, as described above. In such case, the user who resolves an exception or determines how to handle the exception may retrieve the parcel 49 from the exception bin 166 and appropriately process the parcel 49 (e.g., return the parcel 49 to the vendor or send the parcel to the receiving station 163) as may be desired.

When the user of client 27 provides an input indicative of how an exception is resolved or is to be handled, the client logic 202 is configured to update the exception data 131 and/or parcel data 60 to indicate how the exception is resolved or is to be handled. For example, if the exception resulted from a missing PO number, the data 131 and/or 60 may be updated to include the missing PO number. If the exception resulted from an incorrect shipment and if the parcel 49 is to be returned to the vendor, then the data 131 and/or 60 may be updated to indicate that the parcel 49 is to be returned to the vendor. In other examples, the data 131 and/or 60 may be updated to indicate that the parcel 49 is to be processed in any desired manner.

In updating the exception data 131 and/or parcel data 60 at the client 27, the client logic 202 is also configured to similarly update the exception data 131 and/or parcel data 60 at the server 26 so that other users who may access such data 131 and/or 60 from the server 26 are aware of how the exception is to be resolve and/or handled.

In at least one exemplary embodiment, the client logic 202 is configured to calculate various statistics regarding the exceptions indicated by the exception data 131 over time and to output such statistics via the output device 219. For example, in at least one embodiment, the client logic 202 is configured to calculate the total number or a percentage of exceptions associated with parcels 49 from a particular vendor over a specified time period, such as one month or one year, for example. The client logic 202 is also configured to calculate the number or percentage of exceptions by exception type. For example, the client logic 202 may determine the total number of exceptions of a particular type detected over a specified time period, such as one month or one year, for example. In another example, the client logic 202 determines the percentage of exceptions attributable to a particular exception type. Various other statistics may be calculated by the client logic 202 in other examples.

The statistics calculated by the client logic 202 may be useful for a variety of reasons. For example, in one exemplary embodiment, an operator of the facility 24 or other user may impose a fine on a vendor for certain types of exceptions or when a total number of exceptions from the vendor exceeds a predefined threshold. Regardless of whether a fine is imposed, the statistics may be shared with vendors in an effort to pressure or otherwise influence the vendors to better comply with shipping guidelines or employ better shipping techniques in an effort to reduce exceptions. Further, the statistics calculated by the client logic 202 may help expose shipping problems that otherwise would be unnoticed or difficult to discover. For example, the statistics may reveal that a relatively high number or percentage of exceptions are attributable to a certain exception type or vendor. Based on such information, a user may investigate the possible causes of the exceptions in an effort to diagnose and remedy the source of the exceptions.

In at least one embodiment, the client logic 202 is configured to provide internal statistics relative to the operator of the materials handling facility 24. For example, assume that the operator of the materials handling facility 24 is a company having a plurality of internal groups (e.g., divisions), in which each group orders various products from different vendors. Information identifying the internal group that orders a parcel may be attached to the parcels 49 (e.g., on the PO labels 127) received by the system 20. The parcel monitoring logic 52 is configured to locate and read the group identifier from the PO label 127 and to store the group identifier in the parcel data 60 and the exception data 131. Thus, the parcel data 60 can be analyzed to determine which of the internal groups ordered the parcel 49 received by the system 22, and the exception data 131 can be analyzed to determine which of the groups ordered the parcels 49 associated with exceptions. The client logic 202 is configured to calculate statistics based on the group identifiers.

For example, the client logic 202 may be configured to calculate the total number or percentage of exceptions attributable to a particular group over a specified time period, such as one month or one year for example. Further, the percentage may be relative to the total number of shipments ordered by the identified group, the total number of shipments ordered by all of the groups, or some other number of shipment orders or parameter. Further, if desired, the statistics may also be grouped by exception type. Thus, the statistics not only reveal the number or percentage of exceptions attributable to a particular group but also the number or percentage of exceptions of a particular type. For example, the logic 202 may determine, for a particular type of exception, x % of the exceptions are attributable to a particular group, where x is any number between 0 and 100.

Similar to the way that the statistics can be used to influence vendors, the statistics pertaining to internal groups of the operator of the materials handling facility 24 may be used to apply pressure on or influence such groups in a manner that reduces exception occurrences. For example, a particular group may be fined if an excessive number or percentage of exceptions is attributable to such group. In another example, performance evaluations of the groups and/or employees within the group may be based on the statistics calculated by the client logic 202. In addition, such statistics may reveal potential sources of exceptions. In this regard, information indicative of the distribution of exceptions among the groups may be useful in diagnosing potential sources of exceptions, thereby helping a facility operator to discover and remedy such exception sources.

In addition, the data 60, 77, and 131 maintained by the system 22 can be useful in resolving disputes between vendors and an operator of the materials handling facility 24. In this regard, without the system 22, it may be difficult for the operator of the materials handling facility 24 to convince a vendor that a particular exception for a parcel 49 existed prior to arrival of the parcel 49 at the facility 24. For example, if damage occurred to a parcel 49, then it may be difficult for the facility operator to convince a vendor that the damage occurred prior to arrival rather than after arrival. Further, if a shipment has items that are missing, it may be difficult for the facility operator to convince a vendor that the items were missing at the time of arrival instead of being lost after reception of the parcel 49 into the materials handling facility 24. Establishing when other types of exceptions occurred may also be difficult for the operator of the materials handling facility 24.

However, the data 60, 77, and 131 may be helpful to prove to a vendor that an exception existed at the time the associated parcel 49 arrived at the facility 24. In this regard, as described above, the facility operator may implement a policy that requires parcels 49 to be passed through the imaging tunnel 25 shortly after arrival at the materials handling facility 24. For example, each parcel 49 may be unloaded from a delivery truck directly to the conveyor belt 48. Thus, the data 60, 77, and 131 for a particular parcel 49, according to the policy of the facility operator, is defined shortly after the parcel 49 is unloaded from the delivery truck. Accordingly, if the data 60, 77, and 131 defined by the system 22 shortly after delivery shows the existence of an exception, then it is very likely that the exception existed at the time of parcel arrival. For example, if the image data 77 captured for a parcel 49 shows damage to the parcel 49, then it is likely that the parcel 49 was damaged prior to delivery and, in particular, prior to the parcel 49 arriving at the reception station 163. Moreover, if a vendor disputes a claim by the facility operator that an exception existed prior to delivery, then the facility operator may use the data 60, 77, and/or 131 to convince the vendor that the exception is not attributable to the handling that occurred at the facility 24.

As described above, in one exemplary embodiment, the parcel monitoring logic 52 is configured to transmit a notification to a vendor when the logic 52 detects an exception associated with a parcel 49 sent by the vendor. Such notification may include the data 60, 77, and/or 131 on which the logic 52 based a detection of an exception. Per an agreement between the facility operator and the vendor, the vendor may be authorized to assess a fine to the vendor for a certain type of exception, a certain number of exceptions attributable to the vendor's parcels 49, or some other criteria. The notification sent by the parcel monitoring logic 52 may include an assessment of the fine and request the vendor to pay the assessed fine. If the logic 52 communicates a fine to the vendor, the logic 52 updates the exception data 131 to indicate that the fine has been communicated to the vendor.

In one exemplary embodiment, the vendor can pay any such fine electronically via the server 26. Various types of known techniques for effectuating an electronic payment may be employed for receiving such payment at the server 26. In response to such payment, the server 26 is configured to update the exception data 131 stored at the server 26 to indicate when an assessed fine has been paid. Thus, the exception data 131 can be reviewed to determine the status of any outstanding fine.

FIG. 1 shows an exemplary embodiment in which a vendor client 303 is interfaced with the network 29. Such a client 303 may reside at a premise of a vendor or at another location remote from the materials handling facility 24. In one exemplary embodiment, the vendor client 303 is used by the vendor to access the data stored at the server 26 and pertaining to the vendor's parcels 49. The configuration of the vendor client 303 may be similar to that of the client 27. In this regard, the vendor client 303 may comprise a desk-top or lap-top computer, a hand-held personal digital assistant (PDA), or some other known device for exchanging data with a network.

Using the vendor's identifier, the vendor may access data correlated with such identifier and stored at the server 26. In addition, if the vendor receives a notification from the system 22 about an exception, such notification may include the parcel identifier or other information that can be used by the vendor to access data pertaining to the exception from the server 26. Thus, the vendor may use the client 303 to view such data possibly enabling the vendor to resolve the exception. For example, if the exception pertains to a missing PO number, the vendor may update the data stored at the server 26 to include the missing PO number, similar to how the user of client 27 can update the data stored at the server 26. Thus, it is possible for the vendor to update the data at the server 26 and to resolve exceptions without burdening or involving other users.

In various embodiments described above, various exceptions are described as shipment errors or abnormalities. In some examples, an exception may constitute a warning that indicates special handling of a parcel 49 is required or desired. For example, a particular type of label such as a hazardous material ("haz mat") warning may constitute an exception. In one exemplary embodiment, the parcel monitoring logic 52 is configured to search the image data 77 correlated with a parcel 49 for a haz mat warning label or other type of label indicating that the parcel 49 is to be handled with special care or according to special procedures. If such a label is located, the parcel monitoring logic 52 detects an exception. In response to such detection, the parcel monitoring logic 52 is configured to perform various actions, such as controlling the actuator 171 to divert the parcel 49 to the exception path 165 and/or communicating a notification or warning to a user of the system 22 to put such user on notice of the exception. Many other types of exceptions are possible in other examples.

An exemplary operation and use of the system 20 will be described below with particular reference to FIG. 8, which depicts a flow chart that provides one example of the operation of the parcel handling system 20. Alternatively, the flow chart of FIG. 8 may be viewed as depicting steps of an example of a method implemented in the parcel handling system 20 to receive a shipment parcel 49 in a materials handing facility 24. The order of the blocks shown by FIG. 8 may be rearranged such that the blocks are performed in other sequences, if desired.

For illustrative purposes, assume that, according to a purchase order, a vendor is to ship to the materials handling facility 24 a parcel 49 having eight items of a particular product. Further, assume that the PO number for such order is "12345." In other embodiments, the PO number may have other characters and other numbers of digits. Based on the purchase order, the PO data 125 is updated to include data pertaining to the purchase order. In this regard, the PO data 125 is updated to include the PO number "12345," and correlated with this number is other data, such as the item type, number of items, and expected ranges for the size and weight of a shipment parcel 49 for satisfying the order. Also correlated with the PO number is a vendor identifier of the vendor that is to ship such parcel 49.

Assume that the vendor correctly satisfies the order by shipping the appropriate items in a parcel 49 except that the vendor attaches incorrect PO information on the parcel 49. In this regard, assume that the vendor attaches a PO label 127 that includes at least some correct information, such as item type and number of shipped items, but exhibits a PO number of "12346" instead of "12345." The vendor provides the parcel 49 to a delivery service, which delivers the parcel 49 to the materials handling facility 24.

Personnel at the materials handling facility 24, upon receiving the parcel 49 from the delivery service, place the parcel 49 on the conveyor belt 48, which moves the parcel 49 toward the imaging tunnel 25. At some point, the presence of the parcel 49 is sensed by sensors 71, and the parcel's position, size, and weight are respectively measured by sensors 71 and weight sensor 66, as shown by blocks 401 and 403 of FIG. 8. Data indicative of the sensed size and weight is transmitted to the parcel monitoring logic 52, which stores such data in an entry, referred to hereafter as the "parcel's entry," of the parcel data 60.

Figure 8:
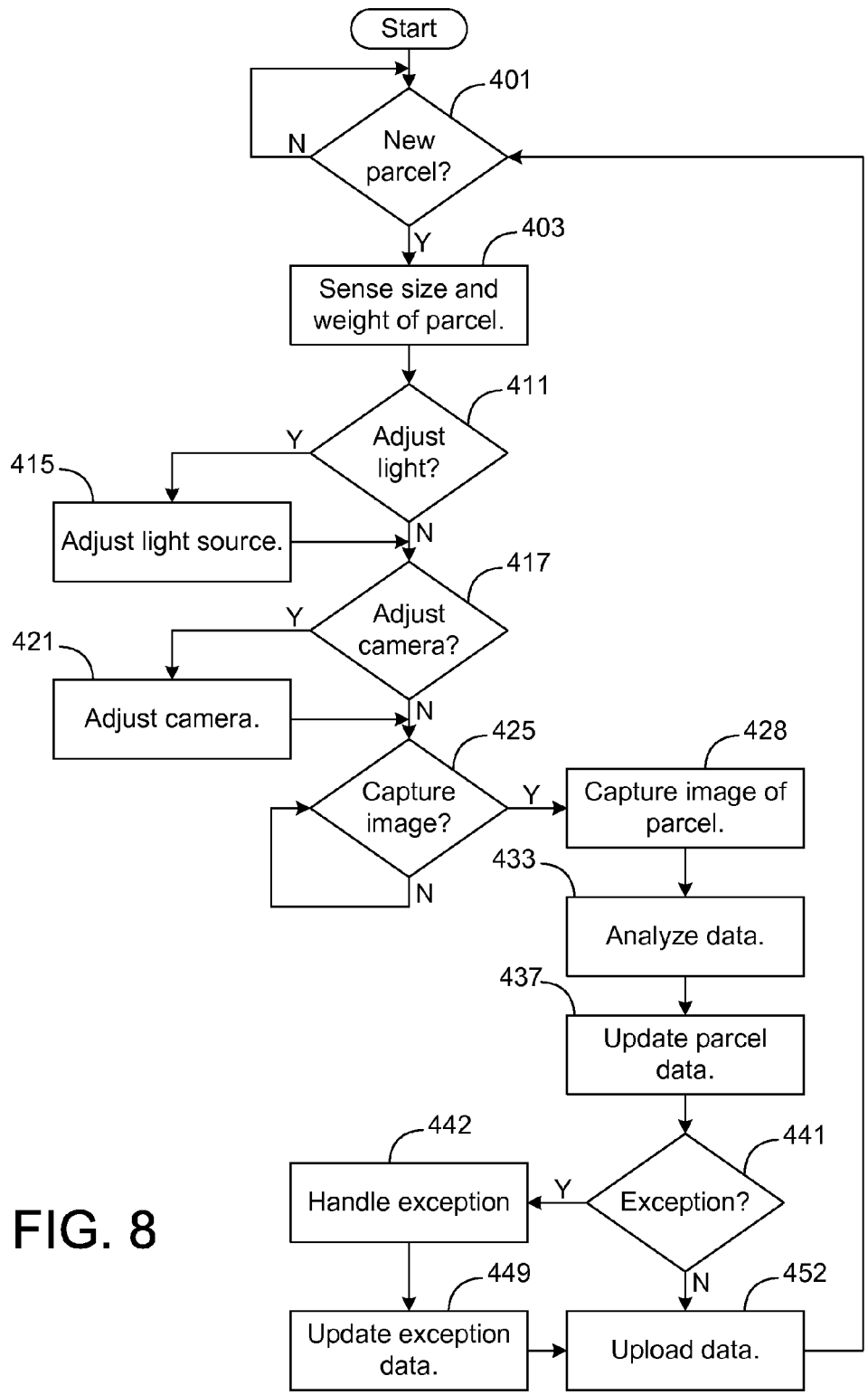
FIG. 8 is a flow chart illustrating an exemplary method of receiving a shipment parcel in a materials handing facility, such as is depicted in FIG. 1.

Based on a position and/or dimension of the parcel 49 measured by the sensors 71, the parcel monitoring logic 52 determines whether to adjust a position or brightness of the light source 75, as shown by block 411 of FIG. 8. If such position or brightness is to be adjusted, the parcel monitoring logic 52 adjusts the light source 75, as shown by block 415. For example, if the light source 75 is to be moved, the parcel monitoring logic 52 transmits, to the motor 85, a control signal for causing the motor 85 to move the light source 75 to the desired position. If the brightness of the light source 75 is to be adjusted, the parcel monitoring logic 52 transmits, to the light source 75, a control signal for adjusting the brightness of the light source 75 to the desired level.

Based on a position and/or dimension of the parcel 49 measured by the sensors 71, the parcel monitoring logic 52 determines whether to adjust a position or focus of the camera 72, as shown by block 417 of FIG. 8. If such position or focus is to be adjusted, the parcel monitoring logic 52 adjusts the camera 72, as shown by block 421. For example, if the camera 72 is to be moved, the parcel monitoring logic 52 transmits, to the motor 82, a control signal for causing the motor 82 to move the camera 72 to the desired position. If the focus of the camera 72 is to be adjusted, the parcel monitoring logic 52 transmits, to the camera 72, a control signal for adjusting the lens of the camera 72 to the desired position.

Based on data from the sensors 71, the parcel monitoring logic 52 determines when the parcel 49 is at a suitable position relative to the camera 72 to initiate an image capture of the parcel 49, as shown by block 425 of FIG. 8. As an example, the parcel monitoring logic 52 may make a "yes" determination in block 425 when the parcel 49 is within view of a lens of the camera 72. When the parcel monitoring logic 52 determines that an image capture is to be initiated, the logic 52 transmits, to the camera 72, a control signal for causing the camera 72 to capture an image of the parcel 49. In response, the camera 72 captures an image of the parcel 49 thereby defining a set of image data 77, as shown by block 428 of FIG. 8, and the camera 72 transmits such image data 77 to the parcel monitoring logic 52, which correlates the image data 77 with the parcel's entry in the parcel data 60. For example, in one exemplary embodiment, the parcel monitoring logic 52 stores the set of image data 77 in a data file and inserts into the parcel's entry a pointer to such data file. Other techniques for correlating the image data 77 with the information in the parcel's entry of the parcel data 60 are possible in other embodiments.

After the image data 77 for the parcel 49 is captured, the parcel monitoring logic 52 analyzes such data 77, as well as the parcel's entry in the data 60, as shown by block 433 of FIG. 8, in order to find information and/or detect exceptions. Assume that the PO number of the PO label 127 attached to the parcel 49 is not scanned by scanner 93. In such an example, the parcel monitoring logic 52 analyzes the image data 77 in an effort to locate the PO number exhibited on the PO label 127. For example, the logic 52 may be configured to search for a bar code and to compare a number indicated by any found bar code to the PO data 125 to see if the number matches a PO number in the data 125. The logic 52 also may be configured to employ OCR techniques in an effort to locate a number and to compare any such located number to the PO data 125 to see if the number matches a PO number in the PO data 125. If a located number matches a PO number indicated by the PO data 125, then the parcel monitoring logic 52 identifies the located number as the parcel's PO number. Thus, the logic 52 updates the parcel's entry in the parcel data 60 to include the identified PO number. The parcel monitoring logic 52 may also use the located PO number as the parcel identifier for the parcel 49.

In the instant example, however, assume that the parcel monitoring logic 52 using OCR techniques or otherwise locates the incorrect PO number "12346." Thus, the logic 52 compares the located number "12346" to the PO numbers indicated by the PO data 60. Assume that, since the located PO number is incorrect, the parcel monitoring logic 52 is unable to find a matching PO number in the PO data 125. Accordingly, the logic 52 detects an occurrence of an exception. In block 437, the parcel monitoring logic 52 updates the parcel data 60 based on the analysis performed in block 433. For example, the logic 52 may store in data 60 a vendor identifier or other type of identifier read from the parcel 49.

In the instant example, the parcel monitoring logic 52 generates a parcel identifier unique to the parcel 49 relative to other parcels being processed at the materials handling facility 24, and the logic 52 stores the parcel identifier in the parcel's entry thereby correlating the identifier with the information in the parcel data 60 and the image data 77 pertaining to the parcel 49. Since the parcel's identifier is not already attached to the parcel 49, the logic 52 instructs the identifier dispenser 61 to attach the parcel identifier to the parcel 49. In response, the dispenser 61 prints a label 62 exhibiting the parcel identifier and attaches the label 62 to the parcel 49.

In the instant example, assume that the parcel monitoring logic 52 in analyzing the image data 77 in block 433 locates a vendor identifier on the parcel's PO label 127. In one exemplary embodiment, the vendor-specific data 147 includes a list of valid vendor identifiers, and the parcel monitoring logic 52 compares a located character string on a parcel 49 to such vendor identifiers. If a located character string matches a vendor identifier of the list, then the parcel monitoring logic 52 identifies the located character string as a vendor identifier. In the instant example, the logic 52 stores the located vendor identifier in the parcel's entry of the parcel data 60. Thus, although the parcel's entry does not yet include the PO number, it does include the vendor identifier of the vendor that sent the parcel 49.

If an exception has been detected, the system 22 handles the exception as shown by blocks 441 and 442. There are various techniques that can be used to handle an exception depending on the type of exception that has occurred. In the instant example, the parcel monitoring logic 52 calls or otherwise activates the exception handling logic 142 and provides such logic 142 with the parcel identifier and vendor identifier correlated with the parcel 49, as well as the exception identifier of the detected exception. In the instant example, the exception identifier indicates that the logic 52 is unable to locate a valid PO number.

The exception handling logic 142, based on the exception identifier and/or vendor identifier, attempts to resolve the exception detected by parcel monitoring logic 52. In the instant example, assume that the exception handling logic 142 consults the vendor-specific data 147 and finds an entry 181 having an exception identifier and vendor identifier that match the ones received from the logic 52. In such case, the exception handling logic 142 analyzes the reception indicator 184 to determine whether the parcel 49 is to be diverted to the exception path 165 in view of the detected exception. For illustrative purposes, assume that the reception indicator 184 indicates that the parcel 49 is not to be diverted to the exception path 165. In such case, the exception handling logic 142 instructs the parcel monitoring logic 52 to allow the parcel 49 to proceed to the receiving station 163. Thus, the logic 52 controls the actuator 171 such that the parcel 49 is not diverted to the exception path 165 but rather continues along the receiving path 164 to the receiving station 163.

As shown by block 449, the parcel monitoring logic 52 updates the exception data 131 based on the detected exception. In this regard, the logic 52 stores in the data 131 information pertaining to the detected exception, such as the parcel identifier associated with the exception, the exception identifier, and a time stamp indicative of when the exception was detected. The exception data 131 also indicates whether the exception has been resolved. Thus, if the exception handling logic 142 is able to resolve the exception, the parcel monitoring logic 52 updates the data 131 to so indicate.

As shown by block 452 of FIG. 8, the parcel monitoring logic 52 uploads to the server 26 the information of the parcel's entry in the data 60, as well as the image data 77 and the exception data 131, if any, correlated with the parcel 49.

For illustrative purposes, assume that the vendor-specific data 147 includes an email address of the vendor and that the exception handling logic 142 is configured to transmit an email notification to such address for any exception correlated with such vendor. In the instant example, the exception handling logic 142 transmits an email notification to the vendor's address. Information pertaining to the detected exception is included in the notification. In the instant example, the notification explains the exception. For example, the notification may include a message indicating that a valid PO number could not be located. In addition, the image data 77 captured for the parcel 49 and the parcel identifier assigned to the parcel 49 are also included in the notification. Thus, the vendor is at least aware of the exception and may take steps to help ensure that similar exceptions do not occur for future shipments.

Assume that the vendor, upon receiving the foregoing message, notices that the parcel's PO label 127 exhibited the incorrect PO number and that the PO number should have been "12345" instead of "12346." In such a situation, the vendor can communicate information to the system 20 or a user of the system 20 to help resolve the exception. There are various other ways that the vendor may assist in resolving the exception.

For illustrative purposes, assume that the vendor utilizes the vendor client 303 to access the server 26. In this regard, using the parcel identifier included in the notification sent to the vendor, the vendor client 303 retrieves the uploaded data correlated with the parcel 49 and updates such data to include the correct PO number "12345." Thus, the exception is effectively resolved by the vendor without burdening personnel of the facility operator.

Now assume that the exception handling logic 142 is not configured to transmit a notification to the vendor or that the vendor does not resolve the exception. There are other ways that the exception can be resolved. For example, the exception could be resolved by a user of the client 27. In this regard, in addition to or in lieu of sending a notification to the vendor, the exception handling logic 142 may send a similar notification to a user of the client 27. Alternatively, the user of the client 27 may initiate retrieval of data from the server 26 without any notification being sent by the exception handling logic 142.

In any event, the user of the client 27 accesses the parcel data 60, image data 77, and exception data 131 pertaining to the detected exception and stored at the server 26. The client 27 displays such data to the user who then attempts to resolve the exception based on the displayed data. For example, the user may call the vendor or send a notification to the vendor asking for his assistance in resolving the exception. The user may also compare the incorrect PO number shown in the image data 77 to valid PO numbers for the same vendor in an effort to determine the correct PO number. The user may take various other steps in an attempt to resolve the exception.

If the user discovers the correct PO number, the user submits inputs via client 27 for updating the parcel data 60 and exception data 131 at the client 27 and server 26. In this regard, the parcel data 60 is updated to include the correct PO number, and the exception data 131 is updated to show that the exception has been resolved.

Accordingly, by implementing the techniques described above, the system 20 automatically detects an exception and facilitates the process of resolving the exception. The system 20 also provides a record of the exception, including images of the parcel 49 at the time of reception at the materials handling facility 24, and the record can be later used to show that the exception is the fault of the vendor, not the personnel or equipment of the materials handling facility 24.

A number of software components are stored in the memory 55 and 205 and are executable by processing elements 57 and 211. In this respect, the term "executable" means a program file that is in a form that can ultimately be run by a processing element. Examples of executable programs may be, for example, a compiled program that can be translated into machine code in a format that can be loaded into a random access portion of the memory 55 and 205 and run by the processing elements 57 and 211, or source code that may be expressed in proper format such as object code that is capable of being loaded into a of random access portion of the memory 55 and 205 and executed by the processing elements 57 and 211. An executable program may be stored in any portion or component of the memory 55 and 205 including, for example, random access memory, read-only memory, a hard drive, compact disk (CD), floppy disk, or other memory components.

The memory 55 and 205 is defined herein as both volatile and nonvolatile memory and data storage components. Volatile components are those that do not retain data values upon loss of power. Nonvolatile components are those that retain data upon a loss of power. Thus, the memory 55 and 205 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A parcel receiving system, comprising:
a conveyor system having a first path and a second path for shipment parcels, the first path extending to a receiving station and the second path extending to an exception bin;
a camera configured to capture an image of a shipment parcel; and
logic configured to analyze the captured image and to read tracking information for the shipment parcel from the captured image, the logic further configured to determine whether the shipment parcel is associated with any of a plurality of exceptions based on the captured image, at least one of the exceptions indicating a defect with the tracking information, at least one of the exceptions indicating damage to the shipment parcel, wherein the logic is configured to control the conveyor system such that the shipment parcel moves along the first path to the receiving station instead of moving along the second path to the exception bin if the logic determines that the shipment parcel is not associated with any of the plurality of exceptions, and wherein the logic is configured to control the conveyor system such that the shipment parcel moves along the second path to the exception bin instead of moving along the first path to the receiving station if the logic determines that the shipment parcel is associated with at least one of the plurality of exceptions.

2. The parcel receiving system of claim 1, further comprising a tunnel, wherein the camera is positioned to capture the image of the shipment parcel while the shipment parcel is within the tunnel.

3. The parcel receiving system of claim 1, wherein the logic is configured to correlate image data defining the captured image with a vendor identifier identifying a vendor of the shipment parcel.

4. A parcel receiving system, comprising:
a conveyor system configured to move a shipment parcel along a first path;
a camera configured to capture an image of the shipment parcel; and
logic configured to analyze the captured image and to read tracking information for the shipment parcel from the captured image, the logic further configured to detect a plurality of exceptions based on the captured image, at least one of the exceptions indicating a defect with the tracking information, at least one of the exceptions indicating damage to the parcel, the logic further configured to control the conveyor system such that the shipment parcel is diverted from the first path to a second path in response to detection of the exception.

5. The parcel receiving system of claim 4, wherein the first path extends to a receiving station where parcels received from the first path are unpacked, and wherein the second path extends to an exception bin where parcels received from the second path are stored.

6. The parcel receiving system of claim 4, further comprising memory configured to store vendor-specific data having a reception indicator, the logic configured to access the reception indicator based on a vendor identifier identifying a vendor of the shipment parcel and an exception identifier identifying the exception, the logic further configured to determine whether to divert the shipment parcel to the second path based on the reception indicator.

7. The parcel receiving system of claim 4, further comprising memory configured to store data indicative of how the exception is to be resolved, the data correlated with a vendor identifier identifying a vendor of the shipment parcel, and wherein the logic is configured to access the data based on the vendor identifier and to resolve the exception based on the data.

8. The parcel receiving system of claim 4, further comprising a tunnel, wherein the camera is positioned within the tunnel.

9. The parcel receiving system of claim 4, further comprising a tunnel, wherein the conveyor system is configured to move the shipment parcel through the tunnel, and wherein the camera is configured to capture the image of the shipment parcel while the shipment parcel is within the tunnel.

10. The parcel receiving system of claim 4, further comprising a sensor configured to sense the shipment parcel, wherein the logic is configured to control the camera based on the sensor.

11. The parcel receiving system of claim 4, further comprising:
a sensor configured to sense the shipment parcel; and
a light source positioned such that light from the light source illuminates the shipment parcel when the image of the shipment parcel is captured by the camera,
wherein the logic is configured to control the light source based on the sensor.

12. The parcel receiving system of claim 4, further comprising memory, wherein the logic is configured to store, in the memory, image data defining the captured image and to correlate a parcel identifier with the image data, the parcel identifier identifying the shipment parcel.

13. The parcel receiving system of claim 12, further comprising:
a network; and
a client configured to access the image data based on the parcel identifier via the network, the client configured to receive a user input for resolving the exception and to transmit data indicative of the user input via the network.

14. The parcel receiving system of claim 4, further comprising memory configured to store contact information associated with a vendor of the shipment parcel, wherein the logic is configured to retrieve the contact information and to transmit image data defining the captured image to the vendor based on the contact information.

15. The parcel receiving system of claim 14, wherein the logic is configured to transmit the image data to the vendor in response to the detection.

16. The parcel receiving system of claim 4, wherein the logic is configured to correlate a vendor identifier and an exception identifier with the shipment parcel, and wherein the logic is configured to automatically resolve the exception based on the exception identifier and the vendor identifier.

17. The parcel receiving system of claim 16, wherein the logic is configured to implement a vendor-specific rule for resolving the exception based on the vendor identifier and the exception identifier.

18. A parcel receiving method, comprising the steps of:
moving a shipment parcel along a first path of a conveyor system;
capturing an image of the shipment parcel;
reading, from the captured image, tracking information for the shipment parcel;
detecting a plurality of exceptions based on the captured image, at least one of the exceptions indicating a defect with the tracking information, at least one of the exceptions indicating damage to the shipment parcel; and
moving the shipment parcel along a second path of the conveyor system in response to the detecting step.

19. The method of claim 18, further comprising the steps of:
storing image data defining the captured image; and
correlating the image data with a parcel identifier identifying the shipment parcel.

20. The method of claim 19, further comprising the steps of:
accessing the image data via a network;
resolving the exception based on the image data accessed via the network; and
transmitting information indicative of the resolving step via the network.

21. The method of claim 18, further comprising the steps of:
correlating a vendor identifier and an exception identifier with the shipment parcel; and
automatically resolving the exception based on the vendor identifier and the exception identifier.

22. The method of claim 18, further comprising the step of moving the shipment parcel through a tunnel, wherein the capturing step is performed while the shipment parcel is within the tunnel.

23. The method of claim 18, further comprising the steps of:
sensing the shipment parcel; and
automatically controlling a camera based on the sensing step.

24. The method of claim 18, further comprising the steps of:
sensing the shipment parcel;
illuminating the shipment parcel via light from a light source during the capturing step; and
controlling the light source based on the sensing step.

25. The method of claim 18, further comprising the step of transmitting image data defining the captured image to a vendor of the shipment parcel.

26. The method of claim 25, further comprising the step of storing contact information associated with the vendor, wherein the transmitting step is based on the contact information.

27. The method of claim 25, wherein the transmitting step is in response to the detecting step.

* * * * *